United States Patent
Huang

(10) Patent No.: US 9,537,598 B2
(45) Date of Patent: Jan. 3, 2017

(54) ARCHITECTURE OF OPEN-FLOW BASED SOFTWARE-DEFINED OPTICAL LABEL SWAPPING

(71) Applicant: NEC Laboratories America, Inc., Princeton, NJ (US)

(72) Inventor: Ming-Fang Huang, Atlanta, GA (US)

(73) Assignee: NEC Corporation (JP)

( * ) Notice: Subject to any disclaimer, the term of this patent is extended or adjusted under 35 U.S.C. 154(b) by 32 days.

(21) Appl. No.: 14/682,701

(22) Filed: Apr. 9, 2015

(65) Prior Publication Data

US 2015/0295821 A1 Oct. 15, 2015

Related U.S. Application Data

(60) Provisional application No. 61/978,714, filed on Apr. 11, 2014.

(51) Int. Cl.
| | |
|---|---|
| *H04J 14/02* | (2006.01) |
| *H04Q 11/00* | (2006.01) |
| *H04L 12/721* | (2013.01) |
| *H04L 12/715* | (2013.01) |

(52) U.S. Cl.
CPC ........ *H04J 14/0212* (2013.01); *H04L 45/62* (2013.01); *H04L 45/64* (2013.01); *H04Q 11/0066* (2013.01); *H04Q 2011/0077* (2013.01)

(58) Field of Classification Search
CPC ...... H04L 45/62; H04L 45/64; H04Q 11/0066; H04Q 2011/0077
See application file for complete search history.

(56) References Cited

U.S. PATENT DOCUMENTS

2006/0093355 A1* 5/2006 Park ................... H04Q 11/0005 398/31
2014/0099116 A1* 4/2014 Bai ...................... H04B 10/532 398/76

OTHER PUBLICATIONS

Cvijetic et al, "SDN and Open Flow for Dynamic Flex-Grid Optical Access and Aggregation Networks", Journal of Lightwave Technology, vol. 32, No. 4, Feb. 15, 2014, pp. 864-870.*

(Continued)

*Primary Examiner* — Leslie Pascal
(74) *Attorney, Agent, or Firm* — Joseph Kolodka

(57) ABSTRACT

A method of optical label swapping implemented by a switch used in a software defined network system that in one embodiment includes providing a 400-Gbit/s payload having a Nyquist shaped carrier in a 75-Ghz bandwidth spacing using a payload generator module controlling at least one first optical laser, and inserting a first optical label adjacent to the payload flow in a remainder of a 100-Ghz bandwidth with a label generator controlling at least one second optical laser. The label generator and the payload generator are controlled by a software defined network (SDN). A package of the payload and the first optical label is transmitted to a receiving node. The optical label can be swapped at the receiving node with a flex grid wavelength selective switch (WSS) controlled by the software defined network.

17 Claims, 10 Drawing Sheets

(56) References Cited

OTHER PUBLICATIONS

Soto et al, "Optical Sinc-Shaped Nyquist Pulses of Exceptional Quality", Nature Comunications, pp. 1-11, Dec. 4, 2013.*
Dong, Z., et al., "Optical Packet Switching Node Design for 400 G Software-Defined Optical Networking with Coherent Detection," Optical Fiber Communication Conference, Mar. 2014 (pp. 1-3).
Huang, M.F. et al., "Transmission of 400G dual-carrier DP-16QAM and multi-carrier DP-QPSK signals over regional and long-haul distances with span lengths greater than 200 km" Optical Fiber Communications Conference and Exhibition (OFC), Mar. 2014. (pp. 1-3).

\* cited by examiner

ARCHITECTURE OF OPEN-FLOW BASED SOFTWARE-DEFINED OPTICAL LABEL SWAPPING

RELATED APPLICATION INFORMATION

This application claims priority to provisional application Ser. No. 61/978,714 filed on Apr. 11, 2014, which is incorporated herein by reference.

BACKGROUND

Technical Field

The present disclosure relates to data transfer. More particularly, the present disclosure is related to the data transmission in a fiber optic network.

Description of the Related Art

The capacity of the fiber-optic network has been increased drastically with coherent communication detection techniques and digital signal processing (DSP). With the commercialization of the 100 GbE, the 400 G or 1 Tb/s per channel being the next target. Meanwhile, elastic spectrum allocation in a flexible channel grid, and transponders to flexibly provide the line rate in accordance with the dynamic requirements of traffic volume make the flexible transmitter and receiver important for future optical networks. Previously, these were mostly achieved by using the synchronous optical network (SONET)/synchronous digital hierarchy (SDH) layer, or Optical Transport Network (OTN). In recent years, software-defined networking (SDN), which delivers better scalability, lower latency, and deterministic performance, is being developed to extend network programmability to the optical layer. To this end, optical label switching (OLS), which enables the routing and forwarding of ultra-high bit rate packets directly in the optical layer, is a promising technology to provide a flexible connection between the physical transport infrastructure and higher-layer software functions.

SUMMARY

The present disclosure provides a method of optical label swapping implemented by a switch used in a software defined network system that includes providing a payload signal having a Nyquist shaped carrier in a first bandwidth spacing using a payload generator module controlling at least one first optical laser, and inserting a optical label adjacent to the payload signal in second bandwidth spacing with a label generator controlling at least one second optical laser. The optical label may either precede or follow the payload signal. The label generator and the payload generator are controlled by a software defined network (SDN) including at least one hardware processor. The method may further include transmitting a package of the payload flow and the optical label to a receiving node. The method may further include swapping the optical label at the receiving node with a flex grid wavelength selective switch (WSS) controlled by the software defined network. In one example, the payload signal is at 400-Gbit/s; the first bandwidth spacing is 75-Ghz; the second bandwidth spacing is a remainder, e.g., 25-Ghz, of a 100-Ghz bandwidth spacing that encompasses the 75-Ghz first bandwidth spacing; and the optical label is at a 10 GbE data rate.

In another aspect of the present disclosure, a system for optical label swapping is provided. The system may be a controller used in a software defined network system for optical label swapping that includes a payload generator module configured to generate with at least one first optical laser within a central office a payload signal having a first bandwidth spacing. The system may further include a label generator module configured to control at least one second optical laser within the central office for generating an optical label adjacent to the payload signal and to substantially occupy a second bandwidth spacing. The optical label may either precede or follow the payload signal. The system may further include a label extractor module for controlling optical label swapping at a node separate from the central office with a flex grid wavelength selective switch (WSS). In one example, the payload signal is at 400-Gbit/s; the first bandwidth spacing is 75-Ghz; the second bandwidth spacing is a remainder, e.g., 25-Ghz, of a 100-Ghz bandwidth spacing that encompasses the 75-Ghz first bandwidth spacing; and the optical label is at a 10 GbE data rate. The payload signal may also have a Nyquist shaped carrier.

In yet another aspect of the present disclosure, a computer program product is provided that includes a non-transitory computer readable storage medium having computer readable program code embodied therein for a method of optical label swapping that includes providing a 400-Gbit/s payload signal having a Nyquist shaped carrier in a first bandwidth spacing using a payload generator module controlling at least one first optical laser. The method may further include inserting an optical label adjacent to the payload signal in a second bandwidth spacing with a label generator controlling at least one second optical laser. The optical label may either precede or follow the payload signal. The label generator and the payload generator are controlled by a software defined network (SDN). The method may further include transmitting a package of the payload signal and the optical label to a receiving node. The method may further include swapping the optical label at the receiving node with a flex grid wavelength selective switch (WSS) controlled by the software defined network. In one example, the payload signal is at 400-Gbit/s; the first bandwidth spacing is 75-Ghz; the second bandwidth spacing is a remainder, e.g., 25-Ghz, of a 100-Ghz bandwidth spacing that encompasses the 75-Ghz first bandwidth spacing; and the optical label is at a 10 GbE data rate.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
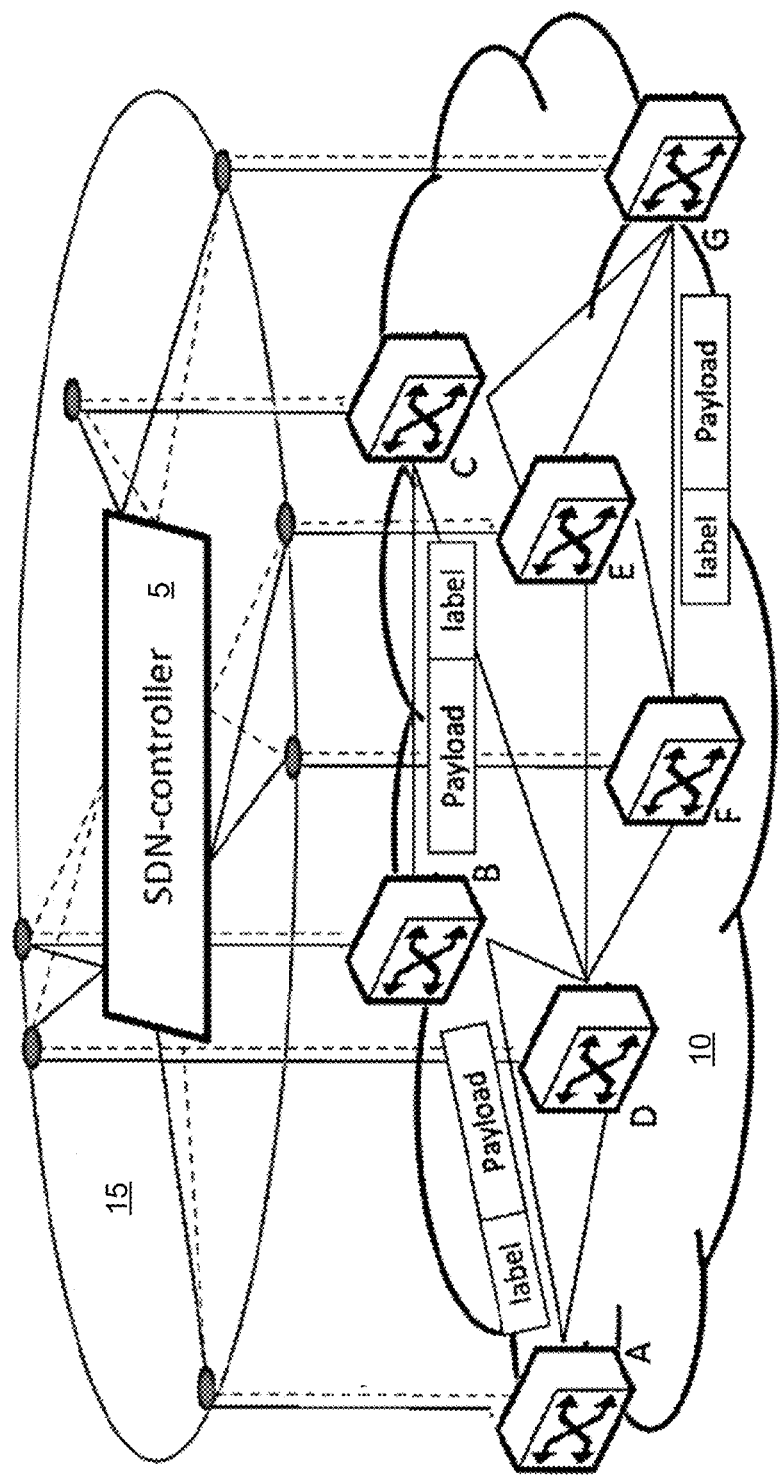
FIG. 1 is a schematic illustrating an OpenFlow based software defined network (SDN) controlled optical label swapping (OLS) architecture, in accordance with one embodiment of the present disclosure.

The ever increasing demand for internet data services is placing high transmission capacity requirements on metro and inter-datacenter networks (DCN). Optical flow switching (OFS) can support high data rate metro and inter-DCN traffic routing with low power consumption. Optical flow switching (OFS) enables high bandwidth and dynamic optical flow processing, providing desirable traffic granularity. Flows entering OFS networks are labeled with forwarding information to properly configure the optical router/switch which sends the flow to its destination.

Optical label swapping (OLS) is one of important techniques employed in OFS networks, and is the process of extracting, processing and re-writing the flow label in an optical core router/switch. An "optical label" may be within each packet of payload data that is being transmitted from a source location to a destination location, and the optical label is typically read at each routing node to determine the proper switch settings for packet forwarding. The optical label is processed by electronics for routing and forwarding functions, whereas the optical payload remains in the optical domain. A network packet is a formatted unit of data carried by a packet-switched network. Computer communication links that do not support packets, such as traditional point-to-point telecommunications links, simply transmit data as a bit stream. When data is formatted into packets (also referred to as packages), the bandwidth of the communication medium can be better shared among users than if the network were circuit switched. A packet can contain two kinds of data: control information and user data (also known as payload). The control information provides data the network needs to deliver the user data, for example: source and destination network addresses, error detection codes, and sequencing information.

Optical label switching is a technique for more effective use of the processing speed of electronic IP routers. In this technique IP packets are accompanied by small optical labels, which the node uses for routing and forwarding decisions. In each node only the label is recovered, processed electronically and a new label is reinserted, while the payload remains in the optical domain.

All-optical label swapping is one approach to implement the flow-by-flow routing and forwarding directly without any optoelectronic conversion from the optical layer.

With the commercialization of 100 Gbit/s systems, 400-Gbit/s technologies have emerged as a leading candidate for next-generation optical transport standards. For next-generation high-speed metro and inter-datacenter networks (DCN), dynamic all-optical label swapping (AOLS) for 400-Gbit/s flows can thus be highly attractive. Further, optical package switching (OPS), which enables the routing and forwarding of ultra-high bit rate packets directly in the optical layer, is a promising technology to provide a flexible connection between the physical transport infrastructure and higher-layer software functions. To enable dynamic and on-demand AOLS, centralized software-defined networking (SDN)-based control of all-optical switching elements, such as flex-grid wavelength selective switches (WSS) can be used in conjunction with an OpenFlow-based vendor-agnostic application programming interface (API).

Software-defined networking (SDN) is an approach to computer networking that allows network administrators to manage network services through abstraction of lower-level functionality. This can be done by decoupling the system that makes decisions about where traffic is sent (the control plane) from the underlying systems that forward traffic to the selected destination (the data plane). Software-defined networking (SDN) can simplify networking. In some embodiments, SDN requires some method for the control plane to communicate with the data plane. Software-defined networking (SDN), which delivers high scalability, low latency, and deterministic performance, has been developed to extend network programmability to the optical layer.

Wavelength Selective Switching (WSS) components are used in wavelength-division multiplexing (WDM) optical communications networks to route (switch) signals between optical fibers on a per-wavelength basis. A WSS comprises a switching array that operates on light that has been dispersed in wavelength without the requirement that the dispersed light be physically demultiplexed into separate ports. Traditionally, the spectrum of light that can be transmitted through the fiber has been divided into frequency intervals of fixed width with a gap of unused frequencies between them. In this context the term wavelength refers to each of these predetermined frequency intervals. This technology is termed WDM, DWDM, or WDWDM depending on the gap of unused frequencies between wavelengths. As alternative architecture emerging in very recent studies is to move away from this rigid DWDM model towards a flexible model in which the usable frequency intervals are of variable width (even within the same link). Every lightpath has to be assigned a frequency interval (sub-spectrum), which remains fixed through all the links it traverses. As in the traditional model, two different lightpaths using the same link have to be assigned disjoint sub-spectra. This technology is termed flex-grid or flex-spectrum, as opposed to fixed grid or fixed spectrum current technology. Specifically, this new technology is feasible due to gridless wavelength selective switches (WSS), based on a very large number of pixels.

OpenFlow is a communications protocol that gives access to the forwarding plane of a network switch or router over the network. OpenFlow enables remote controllers to determine the path of network packets through the network of switches. Typically, at least two controllers are employed—a primary controller, and a secondary controller as backup. In some embodiments, the separation of the control from the forwarding allows for more sophisticated traffic management than is feasible using access control lists (ACLs) and routing protocols. OpenFlow allows remote administration of a switch's packet forwarding tables, by adding, modifying and removing packet matching rules and actions. In some embodiments, routing decisions can be made periodically or ad hoc by the controller and translated into rules and actions with a configurable lifespan, which are then deployed to a switch's flow table, leaving the actual forwarding of matched packets to the switch at wire speed for the duration of those rules. Packets which are unmatched by the switch can be forwarded to the controller. The controller can then decide to modify existing flow table rules on one or more switches or to deploy new rules, to prevent a structural flow of traffic between switch and controller. The controller may even decide to forward the traffic itself, provided that it has told the switch to forward entire packets instead of just their header.

With the software defined network (SDN)-controlled and OpenFlow-based approach, optical label swapping (OLS) can be dynamically realized through match/action combinations in control plane flow tables, providing flexible OLS as well as 400-Gbit/s flow routing capability. Software-defined (SD)-controlled label swapping for beyond 400 G optical networking can be a technique in OPS networks.

In accordance with some embodiments of the methods, systems and computer program products disclosed herein, an all optical label swapping (AOLS) architecture is provided with centralized SDN control, which enables AOLS by dynamically inserting and removing labels, i.e., optical labels, for a 400-Gbit/s flow payload using extended OpenFlow-based control of flex-grid WSS nodes. The proposed approach utilizes a dual-carrier 400-Gbit/s Nyquist-shaped PM-16QAM payload with 75 GHz spacing and a 10 GbE label, such that the joint payload/label signals comply with the 100-GHz WDM grid. By enabling dynamic all optical label swapping (AOLS) and 400-Gbit/s flow routing using SDN control, the proposed approach is attractive for next-generation metro and inter-DCN networking. Moreover, the 10 GbE signal is not only the label; also the real can deliver to the optical network unit (ONU). The architectures that are disclosed herein are the first solutions for 10 GbE label swapping for 500 Gb/s dual-carrier Nyquist shaped PM-16QAM payload system.

It should be understood that embodiments described herein may be entirely hardware or may include both hardware and software elements, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

FIG. 1 illustrates the proposed architecture which consists of two layers. All networking functionality, such as routing, forwarding and transmission, is performed on the optical layer 10, while the electrical software defined network (SDN)-based control plane 15 is responsible for supervising the all-optical label swapping and 400-Gbit/s flow routing. In some embodiments, the software defined network (SDN) controller 5 with an OpenFlow-based application programming interface (API) is used to direct SDN-controlled label swapping by configuring the flex-grid wavelength selective switch (WSS) elements to dynamically create passbands with variable sizes and center frequencies. The transmission and switching of optical flows through the metro/inter-DCN is thus realized using a flex-grid WSS in each network node, e.g., nodes A-G. By dynamically shifting the center frequency and WSS passband width, optical 10-Gbit/s Ethernet (10 GbE) labels can be placed on either side of a 400-Gbit/s payload signal that occupies 75-GHz bandwidth. A 10 GbE label can be used instead of a lower speed option in order to convey richer control information about the high-speed payload flow. The aggregate payload and label bandwidth can thus be kept <100 GHz, complying with a 100-GHz WDM grid.

Figure 2:
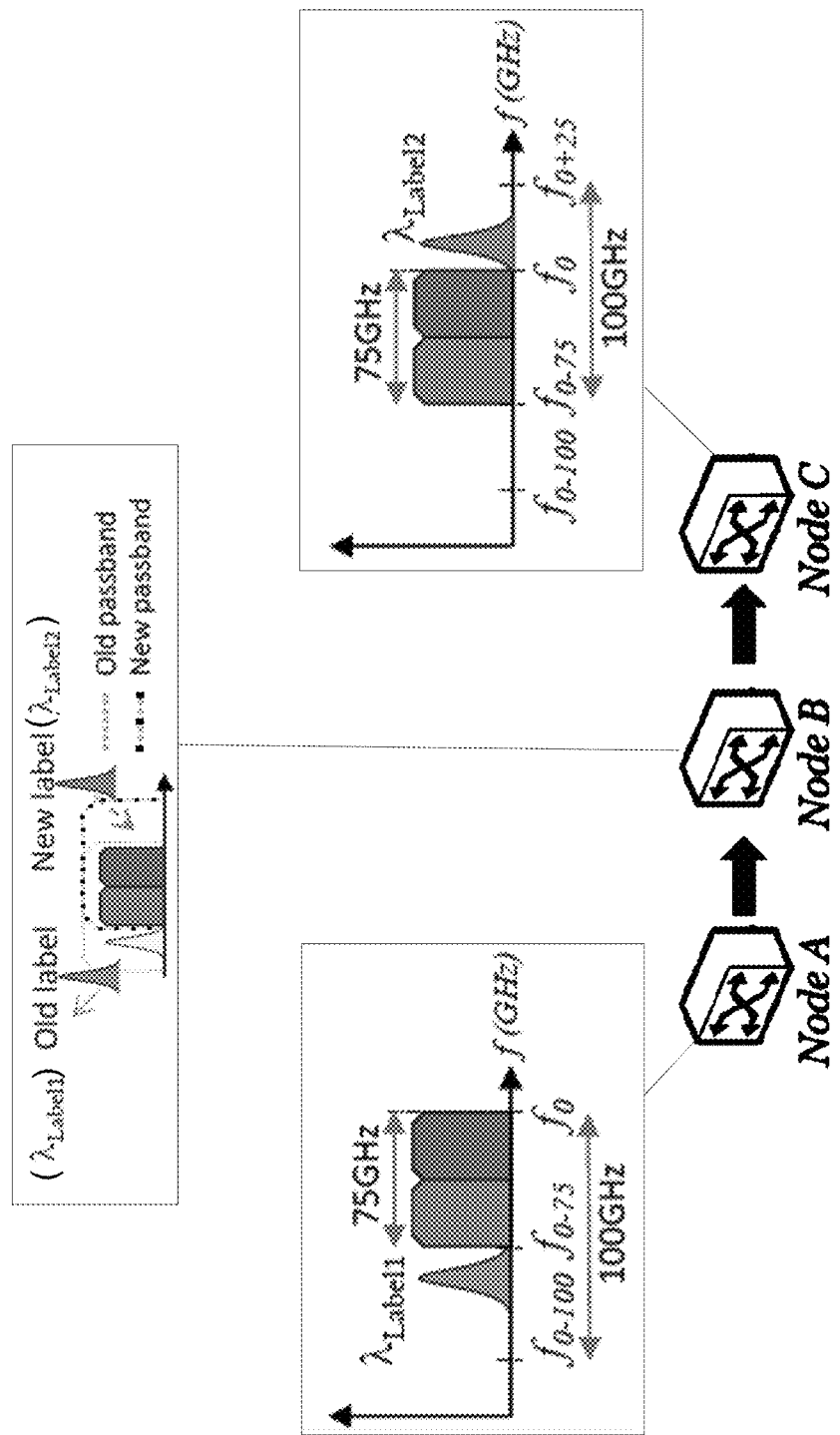
FIG. 2 illustrates plots of a packet signal including a payload and optical label as employed in the optical label swapping architecture, in accordance with one embodiment of the present disclosure.

FIG. 2 shows the detailed operating principle of the disclosed all optical label swapping (AOLS) approach for a 3-node routing path of a 400-Gbit/s payload flow in metro/inter-data center network (DCN). As shown in FIG. 2, the 10 GbE label is placed adjacent to the 400-Gbit/s payload spectrum. In Node A, the label $\lambda_{Label1}$ is added to the left of a dual-carrier 400-Gbit/s payload, with the jointly occupied spectrum remaining under 100 GHz. In some embodiments, by shifting the WSS center frequency and passband using SDN-based OpenFlow control, label $\lambda_{Label1}$ can be all-optically extracted (i.e. filtered) at Node B. Meanwhile, a new label $\lambda_{Label2}$ can be added to the payload by taking advantage of the shifted WSS passband, and then sent to the 3rd-node, i.e., Node C. Compared to previous optical label swapping (OLS) schemes, where a label was inserted in the middle of the 400-Gbit/s payload to comply with the 100-GHz wavelength-division multiplexing (WDM) grid, the OLS approach disclosed herein can offer higher spectral flexibility in label swapping functions without introducing performance degradation to the 400-Gbit/s payload due to narrowband filtering.

Figure 3:
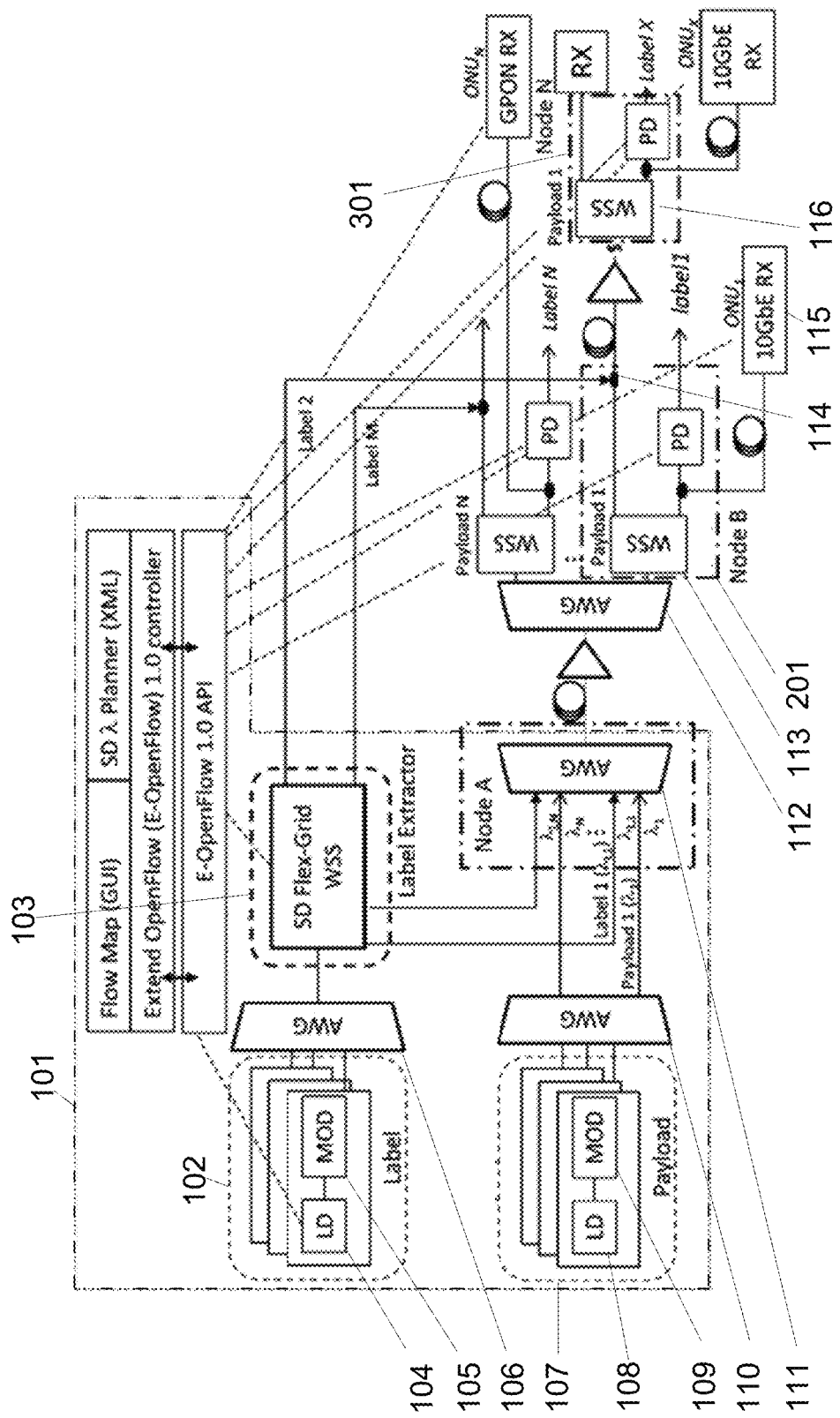
FIG. 3 illustrates one embodiment of the proposed software defined network (SDN) controlled optical label swapping architecture for 400 G and greater networks, in accordance with one embodiment of the present disclosure.

FIG. 3 illustrates one embodiment of the proposed software defined (SD) controlled optical label swapping architecture. At the central office 101, the label generator 102 connects, i.e., optical label generator, to the electrical SDN flow switch 103, which is under the domain of an SDN controller and application programming interface (API) (e.g. OpenFlow). The label generator 102 may include at least one laser diode (LD) 104 and a modulator (MOD) 105. Through dynamic control of SDN-enabled ports, advanced label swapping features are enabled by reconfiguring the effective high data-rate network topology from pure point-to-point or point-to-multipoint/PON to a mesh-like architecture. The proposed architecture can be used for any current existing low data rate (with occupying spacing less than 25 GHz) signals, such as 10 GbE, 2.5-Gb/s OOK (On-off keying), 1.25-Gb/s 00K, etc. The individual wavelength can carry the different services from the individual transmitter at different labels.

In some embodiments, at the payload generator 107, each transmitter contains a laser diode (LD) 108 followed by a modulator (MOD) 109 to generate dual-carrier PM-16QAM signals. For the label generation, e.g., at the label generator 102, it can be any kind of modulation format carried by arbitrary data rate with occupied spacing less than 25 GHz. In one example, the payload generator 107 may include two individual laser diodes (LDs), wherein two carriers are generated from the two laser diodes (LDs). In another example, the payload generator 107 may employ optical carrier suppression (OCS), in which one laser is followed by an intensity modular with, e.g., a 37.5-GHz clock, which is bias at null point to realize optical carrier suppression and generate two carriers. In each of the above examples, a modulator (MOD) may follow, in which drive is provided by a digital-to-analog converter (DAC). For example, the raw data for each payload can be 32 (Gbaud)×4 (bits)×2 (polarization)×2 (carriers)=512 Gb/s. The occupied spacing for each payload can be 75 GHz.

A software defined (SD) flex-grid wavelength selective switch 103 is employed to switch different labels to different payloads. In some embodiments, using a software-defined (SD)-controlled flex-grid wavelength selective switch (WSS) as a label extractor. The software defined (SD) flex-grid wavelength selective switch 103 is under the domain of the SDN network controller and the API (e.g., OpenFlow) to provide the flexibility for label swapping.

Arrayed waveguide grating (AWG) 106 may be present between the modulator 105 of the label generator 102 and the SD flex-grid wavelength selective switch 103. Arrayed waveguide grating (AWG) 110 may also be present between the modulator 109 of the payload generator 107 and node A. Arrayed waveguide grating (AWG) 112 may also be present at node B.

Referring to FIG. 2 (with continued reference to FIG. 3), assuming the package is transmitted from Node A to Node C via Note B (identified by reference number 201), at Node A the package is including a 500 G payload and a low data rate label 1 ($\lambda_{Label1}$). After transmission, the low data rate label 1 $\lambda_{Label1}$ can be extracted at Node B 201 by using a software-defined (SD)-controlled flex-grid wavelength selective switch (WSS). Meanwhile, a new label, label 2 ($\lambda_{Label2}$), can be added to the same payload via an optical coupler 114, and transmitted to another node, such as Node C (identified by reference number 301). The $\lambda_{Label1}$ is not only to be a label, also the traffic which can deliver to operation network unit (ONU) 115 for point of network (PON) networking. In the frequency arrangement, the payload, 500 G dual-carrier signal, is occupying the spacing of 75 GHz. A 25-GHz spacing is suitable for up to 12-Gb/s low data rate label. Therefore, the whole package, i.e., payload, e.g., data, and optical label, is fit into 100-GHz spacing.

Each node, e.g., Node B 201, can provide flexibility for wavelength allocation of label swapping by using software defined (SD) flex-grid wavelength selective switch (WSS) 113. For example, both Node B 201 and Node C 301 include a software defined (SD) flex-grid wavelength selective switch (WSS) 113, 116. The software defined (SD) flex-grid wavelength selective switch (WSS) 113, 116 may be used to separate the payload, i.e., data, and the label of one package. Based on the SDN controller and application programming interface (API) (e.g. OpenFlow, the software defined (SD) flex-grid wavelength selective switch (WSS) 113, 116 has the ability to add labels and drop functionality from the package. The nodes, e.g., Node B 201 and Node C 301, may also include a waveshaper. For example, a 1×2 waveshaper can be used in the node, in which one output is designed to filter out the payload, and another output is used to filter out the label. One output is used for the payload, and the other output is for the label. Each node, e.g., Node B 201 and Node C 301, may include tunable optical filter (TOF). In some examples, each node, e.g., Node B 201 and Node C 301, may include two tunable optical filters (TOFs) instead of one software defined (SD) flex-grid wavelength selective switch (WSS) 113, 116. In some embodiments, in front of each node, one 50:50 optical coupler is employed to split the package into two paths. One TOF is placed in front of each path to select either payload or label signals. The nodes, e.g., Node B 201 and Node C 301, may each include an optical coupler, e.g., the optical coupler identified by reference number 114 at Node B 201. The optical coupler 114 is used for adding a new label to the original payload and to generate a new package. The new label is sent from the central office (CO) 101, and the wavelength is arranged by the label extractor 103.

Referring to FIG. 3, in some embodiments, for each label, e.g., label 1, label 2, label N, label M, and label X, the depicted architecture can deliver downstream traffic to each optical network unit (ONU), e.g., $ONU_1$, $ONU_N$, and $ONU_x$. Each optical network unit (ONU) has at least one receiver (RX). Based on the different receivers, the SD flex-grid WSS in the central office (CO) can select a different label with different modulation format. For example, the SD flex-grid WSS in the central office (CO) and select that the optical network units (ONU) having reference numbers $ONU_1$ and $ONU_N$ have 10 GbE service, and that the optical network units (ONU) having reference number $ONU_x$ has Gigabit-capable Passive Optical Network (GPON) service.

In this scheme, the methods, systems and computer program products of the present disclosure provide for label swapping in transmission packages of 400 G and beyond including both payload, i.e., data, and optical label (OL), in which the transmission package fits into the spacing of 100 GHz. Furthermore, the label swapping is controlled by electrical SDN flow switch, which is under the domain of an SDN controller and API (e.g. OpenFlow). Through dynamic control of SDN-enabled ports, advanced label swapping features are enabled by reconfiguring the effective high data-rate network topology from pure point-to-point or point-to-multipoint/PON to a mesh-like architecture. Moreover, the label signal is not one the label in the node, also can deliver the downstream traffic to the ONU.

In accordance with some embodiments of the present disclosure, the methods, systems and computer program products that are disclosed herein can provide a solution for flexible and easy label swapping in 400 G and beyond packages. For package generation, in order to fit the occupying spacing of 100 GHz, the payload is generated at 500 G Nyquist shaped PM-16QAM in 75 GHz spacing, and the label is occupied the remaining spacing of 25 GHz. For label extraction, a label extractor may be employed using a software-defined (SD)-controlled flex-grid wavelength selective switch (WSS) as the label extractor. It is under the domain of an SDN controller and API (e.g. OpenFlow) to provide the flexibility for label swapping. In some embodiments, each optical network unit (ONU) has one receiver. Based on the different receiver, the SD flex-grid WSS in the CO can select different label with different modulation format, such as has 10 GbE service and has GPON service.

Figure 4:
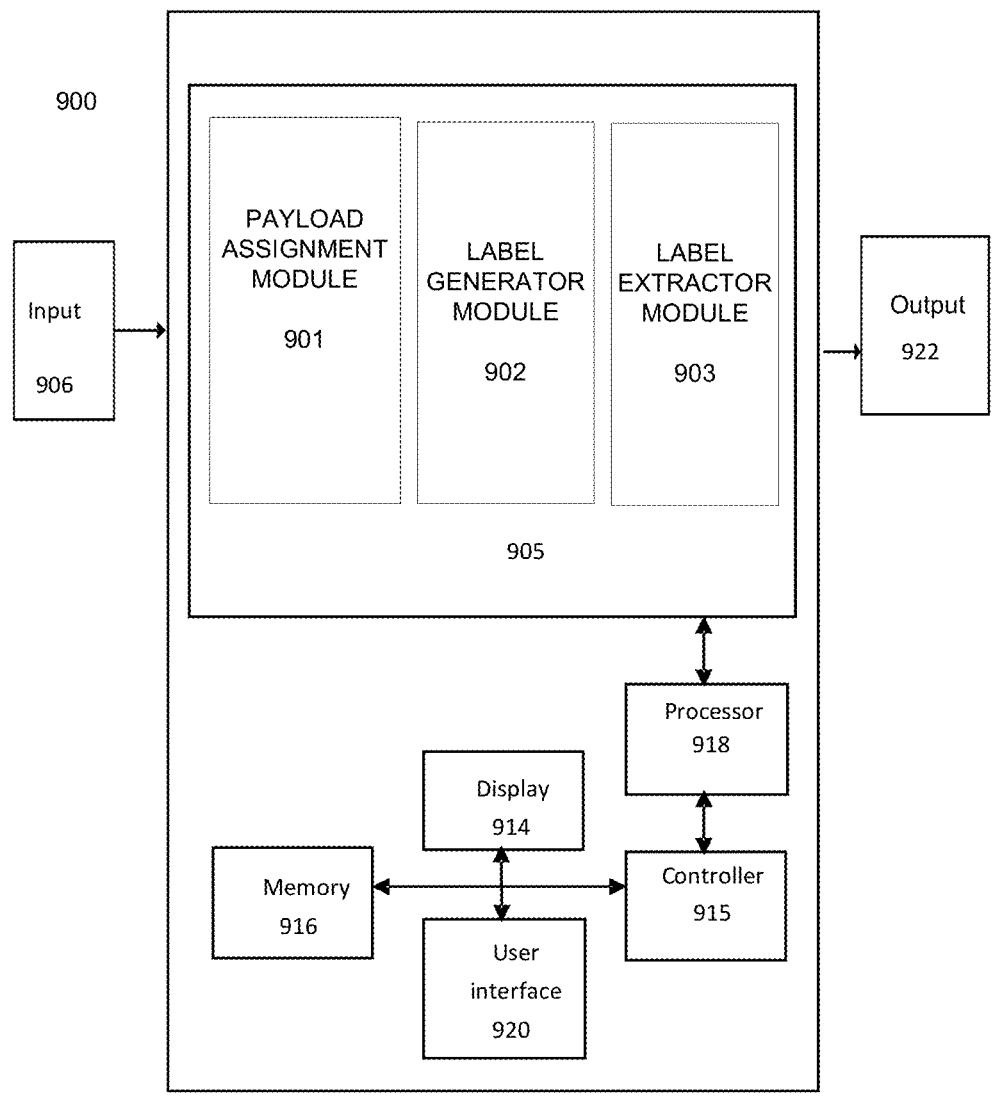
FIG. 4 is a block diagram of a system for all optical label swapping (AOLS), in accordance with one embodiment of the present disclosure.

In another aspect of the present disclosure, a system for optical label swapping is provided, as depicted in the block diagram this is provided by FIG. 4. More specifically, the system 900 may provide a controller used in a software defined network system for optical label swapping (OLS). The system 900 for using the all optical label switching (AOLS) architecture may include a payload generator module 901 configured to generate with at least one first optical laser within the central office (CO) 101 a payload signal having 75 Ghz bandwidth spacing. The functions of the payload generator module 901 have been described above with reference to FIGS. 1-3. For example, the function of the payload generator module 901 may be provided by the payload generator 107 described above with reference to FIG. 3.

The system may further include a label generator module 902 configured to control at least one second laser within the central office (CO) 101 for generating an optical label adjacent to the payload signal and to occupy a remaining bandwidth of a 100 Ghz spacing. The functions of the label generator module 902 have been described above with reference to FIGS. 1-3. For example, the function of the label generator module 902 may be provided by the label generator 102 described above with reference to FIG. 3. The package transmitted including the payload and the optical label has been described in greater detail with reference to FIG. 2.

The system may further include a label extractor module 903 for controlling optical label swapping at a node separate, e.g., Node B 201 and/or Node C 301, from the central office (CO) 101 with a flex grid wavelength selective switch (WSS). The functions of the label extractor module 903 have been described above with reference to FIGS. 1-3. For example, the function of the label extractor module 903 may be provided by the label extractor 103 and the optical coupler 114 described above with reference to FIG. 3.

In some embodiments, the payload generator module 901, the label generator module 902, and the label extractor modules 903 may be modules of the software defined network (SDN) controller module 905.

In one embodiment, the system 900 preferably includes one or more processors 918, e.g., hardware processor, and memory 916 for storing applications, modules and other data. In one example, the one or more processors 918 and memory 916 may be components of a computer, in which the memory may be random access memory (RAM), a program memory (preferably a writable read-only memory (ROM) such as a flash ROM) or a combination thereof. The computer may also include an input/output (I/O) controller coupled by a CPU bus. The computer may optionally include a hard drive controller, which is coupled to a hard disk and CPU bus. Hard disk may be used for storing application programs, such as some embodiments of the present disclosure, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link.

The system 900 may include one or more displays 914 for viewing. The displays 914 may permit a user to interact with the system 900 and its components and functions. This may be further facilitated by a user interface 920, which may include a mouse, joystick, or any other peripheral or control to permit user interaction with the system 900 and/or its devices, and may be further facilitated by a controller 915. It should be understood that the components and functions of the system 900 may be integrated into one or more systems or workstations. The display 914, a keyboard and a pointing device (mouse) may also be connected to I/O bus of the computer. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

The system 900 may receive input data 906 which may be employed as input to a plurality of modules, which can be collectively referred to as the software defined network (SDN) 905, which control some functions of the all optical label swapping (AOLS) system. The system 900 may produce output data 912, which in one embodiment may be displayed on one or more display devices 914. It should be noted that while the above configuration is illustratively depicted, it is contemplated that other sorts of configurations may also be employed according to the present principles.

The following examples are provided to further illustrate the present disclosure and demonstrate some advantages that arise therefrom. It is not intended that the disclosure be limited to the specific examples disclosed.

EXAMPLES

Figure 5:
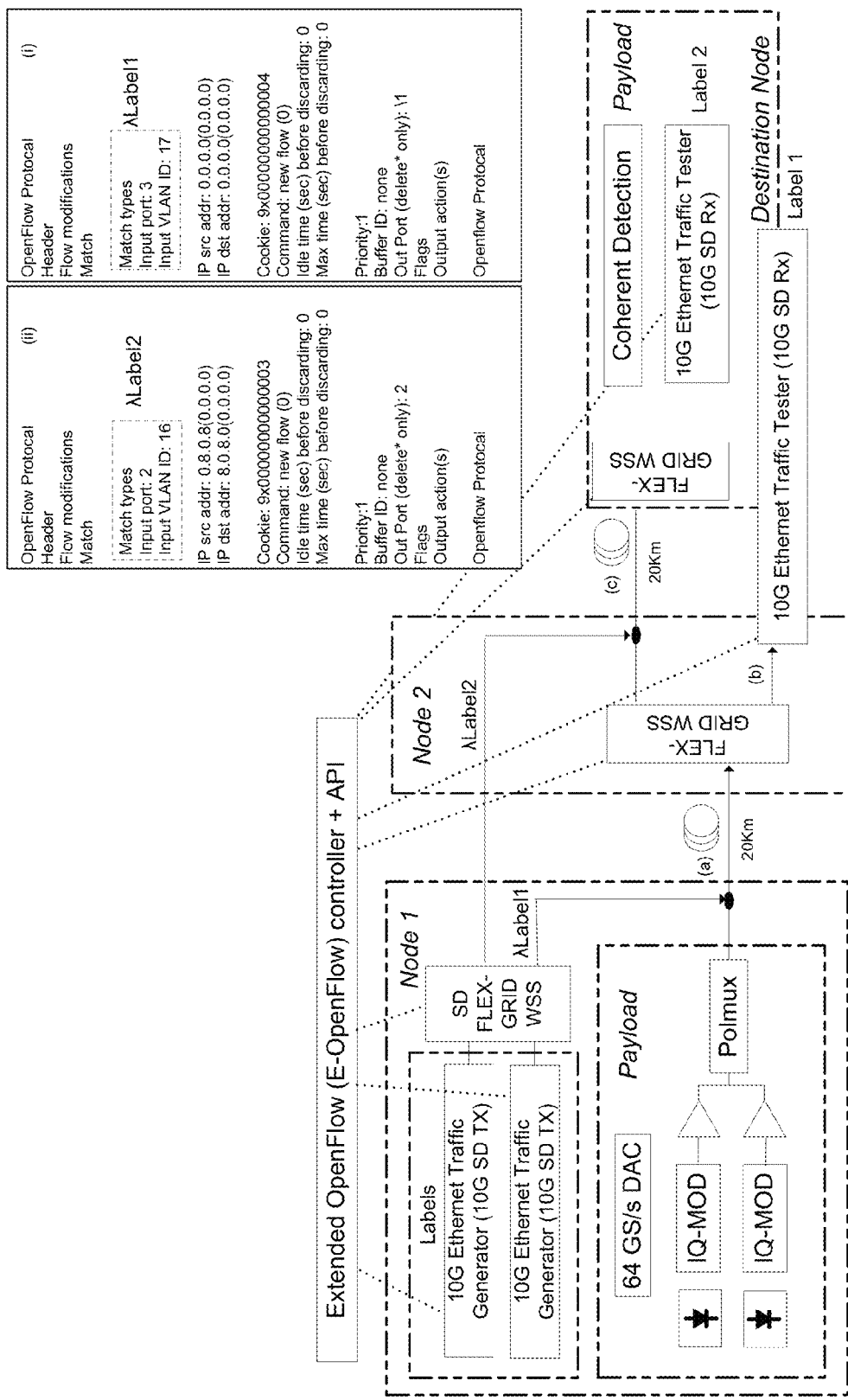
FIG. 5 depicts an experimental set up for one embodiment of the software defined network (SDN) controlled optical label swapping architecture of the present disclosure.
Figure 6B:
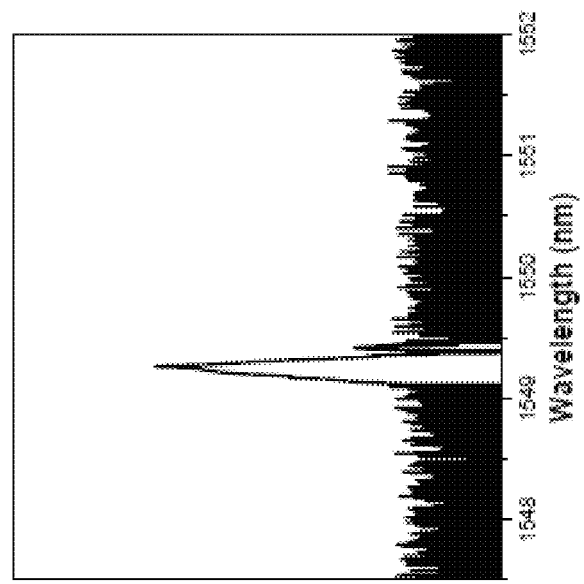
FIGS. 6A-6E are plots of received optical spectra taken from the experimental set up depicted in FIG. 5.
Figure 6A:
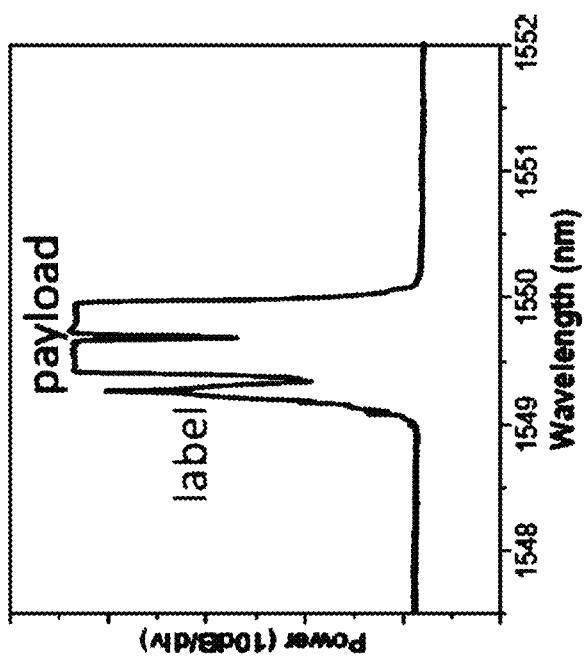
Figure 6C:
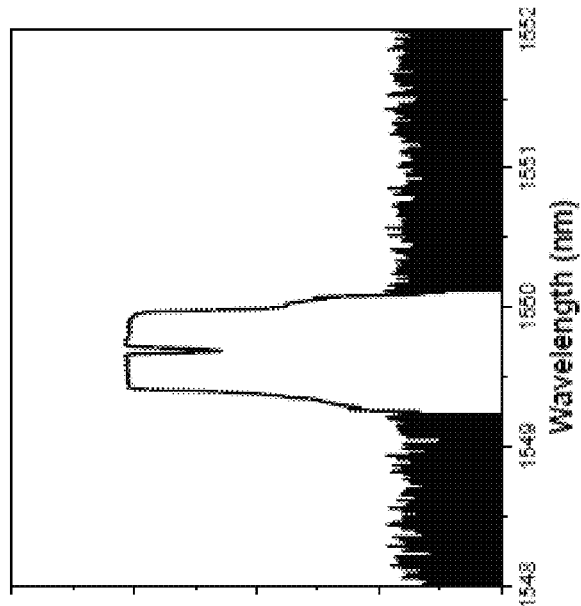
Figure 6D:
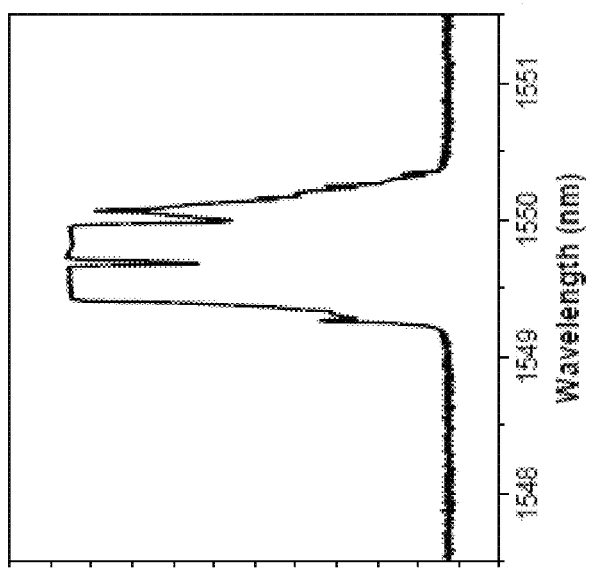
Figure 7:
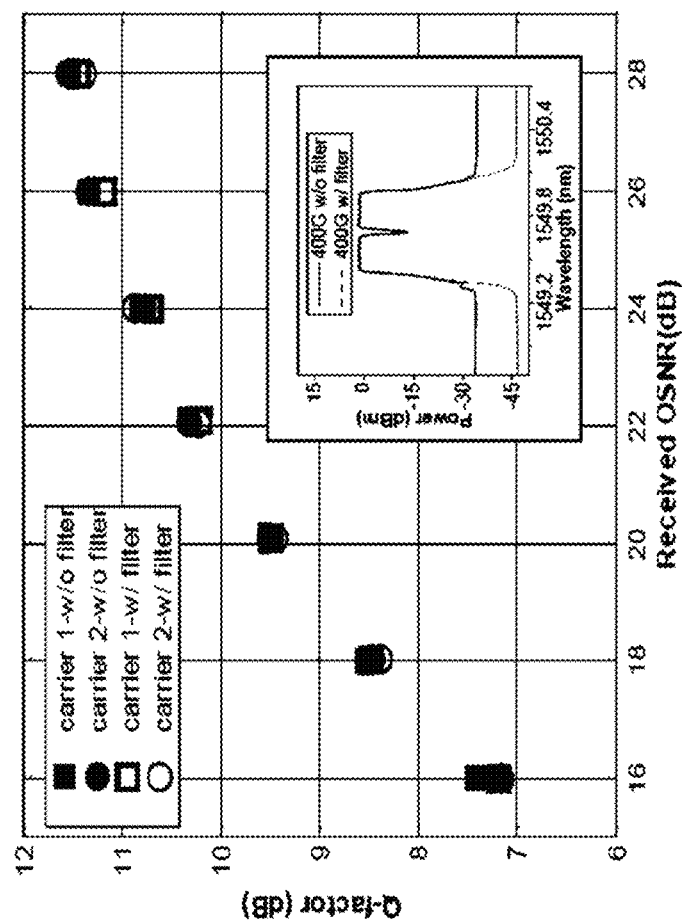
FIG. 7 is a plot illustrating the back to back performance of dual carrier 400 G signal with and without passing through a filter. The optical spectrum (0.01-nm resolution) is depicted in the insert.
Figure 6E:
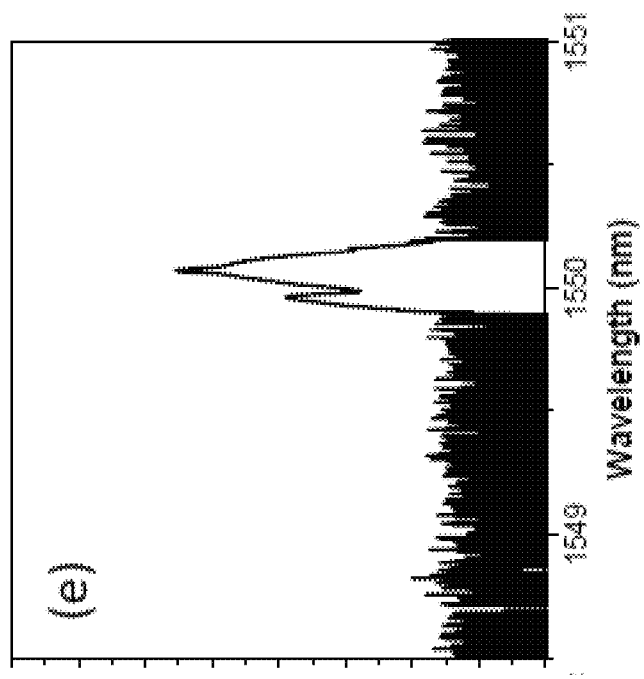
Figure 8:
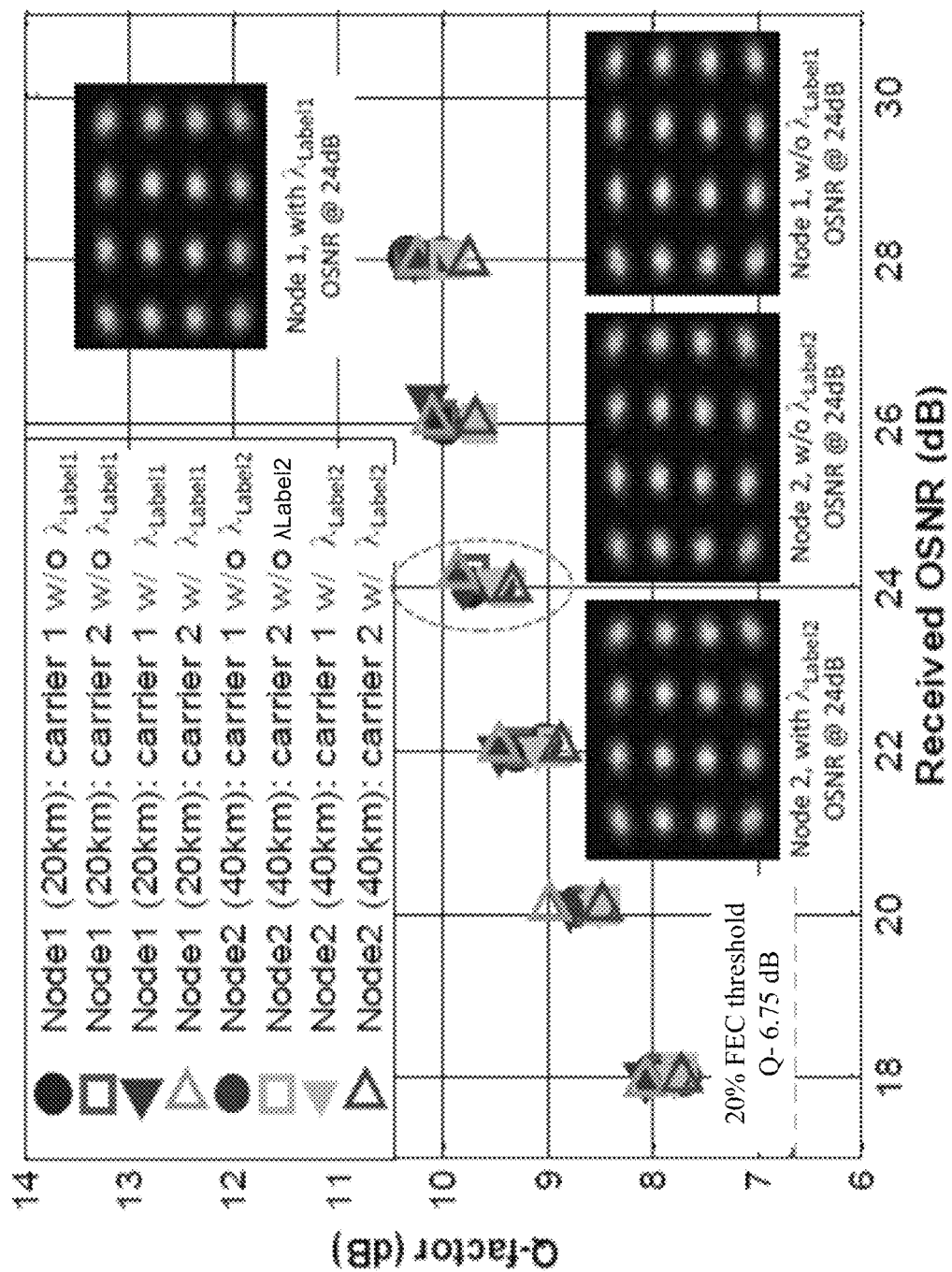
FIG. 8 is a plot illustrating Q-factor and constellation maps for 400-Gbit/s payload at different nodes with and without optical labels in the experimental set up depicted in FIG. 5.
Figure 9:
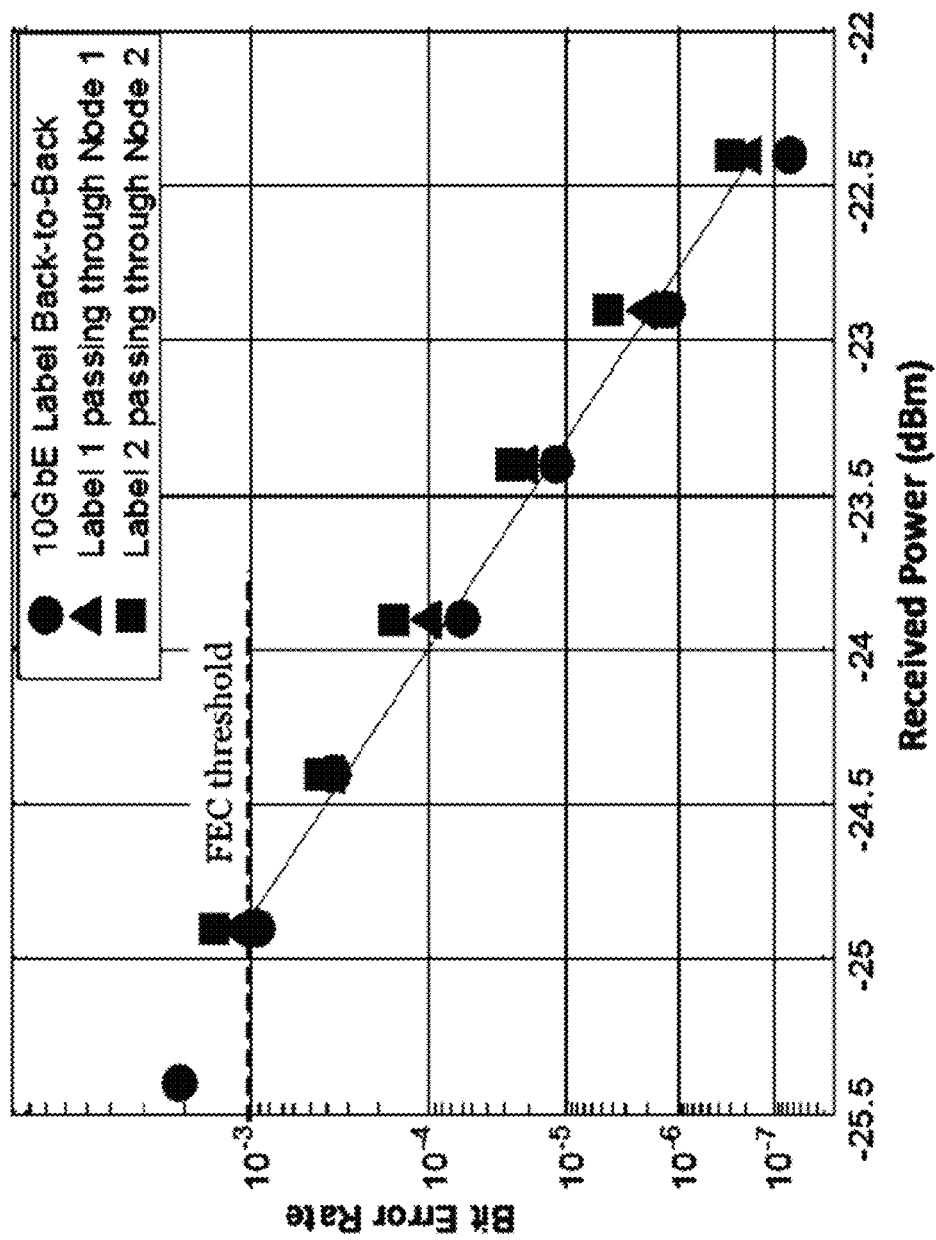
FIG. 9 is a plot of received bit error rate (BER) for 11.1-Gb/s labels at different notes in the experimental set up depicted in FIG. 5.

The experimental setup is shown in FIG. 5. An extended OpenFlow1.0 (E-OpenFlow) controller and API running on a PC was linked via TCP/Ethernet connections to SDN-controlled flex-grid WSS and 10 G transceivers (Tx/Rx). Label flows between OpenFlow ports were established through SDN control of the flex-grid WSS using the Flow-Mod command by matching on the VLAN ID field of OpenFlow1.0. An example is shown in openflow protocol (i) and openflow protocol (ii), for VLAN ID=17 matching to $\lambda_{Label1}$=1549.25 nm at input port 3 and $\lambda_{Label2}$ (1549.93 nm, VLAN ID=16) at port 2 to create dual label flows and send them to different nodes. For the payload, two ECLs (external cavity lasers) with 37.5-GHz spacing were used to generate a dual-carrier 400-Gbit/s signal. The carriers were modulated by two independent modulators (IQ-MODs) using 32 Gbaud 16QAM Nyquist signals output by a digital-to-analog converter (DAC) with 64-GS/s sampling rate. Polarization multiplexing (PolMUX) was performed by delaying one copy of the modulated optical signal by ~250 symbols and then polarization-combining the two orthogonal copies. The raw data rate of the payload was 512 Gbit/s (net data rate is 427 Gbit/s assuming 20% FEC overhead). The optical spectrum after Node1 is shown in FIG. 6A. At each node, a flex-grid 15/85-GHz WSS was used to split (i.e. filter) the payload and label. The removal of $\lambda_{Label1}$ and the insertion of a new label, $\lambda_{Label2}$, at Node 2 are displayed in FIGS. 6B and 6C, respectively. At the destination node, the received payload and label are exhibited in FIGS. 6D and 6E, respectively. At the 400-Gbit/s payload receiver (Rx) side, a standard coherent receiver was used, featuring a tunable optical filter with 0.4-nm resolution to sequentially filter out and measure data on each of the two carriers. A local oscillator (LO) was used to down-convert the signal into baseband, and followed by a polarization-diversity 90 degree hybrid with four balanced photodiodes (PDs). A series of digital signal processing (DSP) algorithms were performed to recover the transmitted 16QAM symbols. The DSP algorithm details can be found in the publication M.-F. Huang et al., *Transmission of 400G Dual-Carrier DP-16QAM and Multi-Carrier DP-QPSK Signals over Regional and Long-Haul Distances with Span Lengths Greater than 200 km*, Proc. OFC, Th4F.3 (2014), which is incorporated herein by reference. For the optical labels, 10 GbE traffic was applied as input to the optical client interfaces of the 10 G transmitter (Tx)/receiver (Rx) for traffic generation and performance measurement. Each 10 G Tx contained a tunable DFB laser and a 11.1-Gbit/s NRZ OOK encoder and FEC encoder with 7% overhead (FEC threshold at BER=$3\times10^{-3}$), while each 10 G Rx included a PD and FEC decoder used to measure BER based on $6.6\times10^{11}$ bits. In FIG. 7, the impacts of narrow filtering effects on the 400-Gbit/s payload were investigated in back-to-back configurations, w/ and w/o a filter (i.e. flex-grid WSS with a 85-GHz passband). The results show negligible OSNR penalty (0.1-nm resolution bandwidth) for dual-carrier transmission through the filter. FIG. 8 shows the received Q-factor for the 400 G payload and the constellation maps (all at OSNR=24 dB) at different nodes. From FIG. 8, at Node 1, there was no OSNR penalty resulting from the label insertion. There was a <0.3-dB Q-factor payload degradation from Node 1 to Node 2 due to label swapping, which is attributed to the imperfect passband of the $2^{nd}$ flex-grid WSS. FIG. 9 shows the BER performance for the 10 GbE labels, confirming that the FEC threshold was satisfied at −24.6 dBm received power.

A SDN-controlled OpenFlow1.0-based flex-grid architecture for dynamic all-optical label swapping has been demonstrated for next-generation optical flow switched metro and inter-datacenter networks. SDN-control of flex-grid WSS network switching elements was exploited for flexible 10 GbE label swapping for 400-Gbit/s payload flows with negligible 400-Gbit/s payload penalty, and with the aggregate label and payload signal complying with a 100-GHz WDM grid. In one embodiment, the proposed approach is attractive for dynamic, high-speed optical flow switching in next-generation metro and inter-datacenter networks.

The foregoing is to be understood as being in every respect illustrative and exemplary, but not restrictive, and the scope of the methods, systems and computer program products disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the disclosure. Those skilled in the art could implement various other feature combinations without departing from the scope and spirit of the disclosure.

What is claimed is:

1. A method of optical label swapping implemented by a switch used in a software defined network system comprising:
   providing a payload signal having a Nyquist shaped carrier in a first bandwidth spacing using a payload generator module controlling at least one first optical laser;
   inserting an optical label adjacent to the payload signal in a second bandwidth spacing with a label generator controlling at least one second optical laser, the optical label either preceding or following the payload signal, wherein the label generator and the payload generator are controlled by said software defined network (SDN) system including at least one hardware processor;
   transmitting a package of the payload and the optical label to a receiving node; and
   swapping the optical label at the receiving node with a flex grid wavelength selective switch (WSS) controlled by the software defined network;
   wherein the payload signal is at 400-Gbit/s, the first bandwidth spacing is 75-Ghz, the second bandwidth spacing is remainder of a 100-Ghz bandwidth spacing that encompasses the first bandwidth spacing, and the optical label is at a 10 GbE data rate.

2. The method of claim 1, wherein said swapping the optical label at the receiving node comprises shifting the center frequency and wavelength selective switch (WSS) passband width to provide that the optical label can be placed on either side of the 400-Gbit/s payload signal that occupies the 75-GHz bandwidth.

3. The method of claim 1, wherein the optical label comprises at least one of destination network addresses, error detection codes, sequencing information or a combination thereof.

4. The method of claim 1, wherein while swapping the optical label, the payload signal remains in an optical domain.

5. The method of claim 1, wherein the payload signal and the optical label are transmitted over a 100-GHz wavelength-division multiplexing (WDM) grid.

6. The method of claim 1, wherein the method of optical label swapping is executed by a two level architecture, wherein networking functionality including routing, forwarding and transmission is performed on an optical layer, and the software defined network (SDN) system controls all said swapping the optical label on an electrical control level.

7. A controller used in a software defined network system for optical label swapping (OLS) comprising:
   a payload generator module configured to generate with at least one first optical laser within a central office a payload signal having a first bandwidth spacing;
   a label generator module configured to control at least one second laser within the central office for generating an optical label adjacent to the payload signal and to occupy a second bandwidth spacing, the optical label either preceding or following the payload signal; and
   a label extractor module for controlling optical label swapping at a node separate from the central office with a flex grid wavelength selective switch (WSS);
   wherein the payload signal is at 400-Gbit/s, the first bandwidth spacing is 75-Ghz, the second bandwidth spacing is remainder of a 100-Ghz bandwidth spacing that encompasses the first bandwidth spacing, and the label generator module produces said optical label at a 10 GbE data rate.

8. The controller of claim 7, wherein the optical label comprises at least one of destination network addresses, error detection codes, sequencing information or a combination thereof.

9. The controller of claim 7, wherein the label extractor module is controlled by a software defined network (SDN)-based OpenFlow control at the central office.

10. The controller of claim 7, wherein the payload signal and the optical label are transmitted over a 100-GHz wavelength-division multiplexing (WDM) grid.

11. The controller of claim 7, wherein swapping the optical label by said label extractor module comprises shifting the center frequency and wavelength selective switch (WSS) passband width to provide that the optical label can be placed on either side of the 400-Gbit/s payload signal that occupies the 75-GHz bandwidth.

12. The controller of claim 11, wherein while said swapping of the optical label, the payload signal remains in an optical domain.

13. A computer program product is provided that includes a non-transitory computer readable storage medium having computer readable program code embodied therein for a method of optical label swapping comprising:

providing a payload signal having a Nyquist shaped carrier in a first bandwidth spacing using a payload generator module controlling at least one first optical laser;

inserting an optical label adjacent to the payload flow in a second bandwidth spacing with a label generator controlling at least one second optical laser, the optical label either preceding or following the payload signal, wherein the label generator and the payload generator are controlled by a software defined network (SDN) including at least one hardware processor;

transmitting a package of the payload and the optical label to a receiving node; and swapping the optical label at the receiving node with a flex grid wavelength selective switch (WSS) controlled by the software defined network;

wherein said swapping the optical label at the receiving node comprises shifting the center frequency and wavelength selective switch (WSS) passband width to provide that the optical label can be placed on either side of a 440-Gbit/s payload signal that occupies a 75-GHz bandwidth.

14. The computer program product of claim 13, wherein the payload signal is at 400-Gbit/s, the first bandwidth spacing is 75-Ghz, the second bandwidth spacing is remainder of a 100-Ghz bandwidth spacing that encompasses the first bandwidth spacing, and the optical label is at a 10 GbE data rate.

15. The computer program product of claim 13, wherein the optical label comprises at least one of destination network addresses, error detection codes, sequencing information or a combination thereof.

16. The computer program product of claim 13, wherein the payload signal and the optical label are transmitted over a 100-GHz wavelength-division multiplexing (WDM) grid.

17. The computer program product of claim 13, wherein the method of optical label swapping is executed by a two level architecture, wherein networking functionality including routing, forwarding and transmission is performed on an optical layer, and the software defined network (SDN) controls all said swapping the optical label on an electrical control level.

* * * * *